United States Patent
Guo

(10) Patent No.: US 11,044,672 B2
(45) Date of Patent: Jun. 22, 2021

(54) STATION WAKE-UP METHOD AND STATION

(71) Applicant: HUAWEI TECHNOLOGIES CO., LTD., Guangdong (CN)

(72) Inventor: Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/657,645

(22) Filed: Oct. 18, 2019

(65) Prior Publication Data

US 2020/0053648 A1    Feb. 13, 2020

Related U.S. Application Data

(63) Continuation of application No. PCT/CN2018/082226, filed on Apr. 8, 2018.

(30) Foreign Application Priority Data

Apr. 19, 2017 (CN) .......................... 201710257732.2

(51) Int. Cl.
*H04W 52/02* (2009.01)
*H04W 84/12* (2009.01)
*H04W 88/02* (2009.01)

(52) U.S. Cl.
CPC ........ *H04W 52/0229* (2013.01); *H04W 84/12* (2013.01); *H04W 88/02* (2013.01)

(58) Field of Classification Search
CPC . H04W 52/0229; H04W 84/12; H04W 88/02; H04W 52/0235; H04W 52/28; Y02D 30/70

See application file for complete search history.

(56) References Cited

U.S. PATENT DOCUMENTS

2006/0165031 A1    7/2006 Wang et al.
2012/0320809 A1    12/2012 Sturm et al.
(Continued)

FOREIGN PATENT DOCUMENTS

CN    102076067 A    5/2011
CN    103260227 A    8/2013
(Continued)

OTHER PUBLICATIONS

PCT International Search Report and Written Opinion in International Application No. PCT/CN2018/082,226, dated Jun. 15, 2018, 15 pages (With English Translation).
(Continued)

*Primary Examiner* — Diane D Mizrahi
(74) *Attorney, Agent, or Firm* — Fish & Richardson P.C.

(57) ABSTRACT

Embodiments of the present invention disclose a station wake-up method and a station, where the station wake-up method may include: sending, by a station, a first radio frame to an access point, where the first radio frame includes first indication information, and the first indication information is used to indicate that the station requests to enter a conventional power save mode; sending, by the station, a second radio frame to the access point, where the second radio frame includes second indication information, and the second indication information is used to indicate that the station requests to enter a wake-up radio WUR sleep mode; and when the station is in both the conventional power save mode and the WM sleep mode, waking up, by the station, a main transceiver when receiving a wake-up frame, where the main transceiver does not wake up according to a preset time period.

18 Claims, 6 Drawing Sheets

(56) References Cited

U.S. PATENT DOCUMENTS

| | | | |
|---|---|---|---|
| 2014/0112226 A1 | 4/2014 | Jafarian et al. | |
| 2016/0127995 A1 | 5/2016 | Merlin et al. | |
| 2016/0381636 A1 | 12/2016 | Park et al. | |
| 2019/0268192 A1* | 8/2019 | Lim | H04L 27/06 |
| 2020/0084720 A1* | 3/2020 | Marin | H04W 52/0206 |
| 2020/0288397 A1* | 9/2020 | Ahn | H04W 74/0808 |

FOREIGN PATENT DOCUMENTS

| | | |
|---|---|---|
| CN | 104737597 A | 6/2015 |
| CN | 104756560 A | 7/2015 |

OTHER PUBLICATIONS

Chu, "WUR MAC Consideration," Marvell, IEEE 802.11-16/1460r1, XP068110884, Nov. 6, 2016, 8 pages.

Extended European Search Report issued in European Application No. 18787560.4 dated May 15, 2020, 9 pages.

Kim et al., "Initial Negotiation for WUR," ETRI, IEEE 802.11-17/0070r0, XP068112492, Jan. 16, 2017, 9 pages.

Kim et al., "WUR MAC issus", LG Electronics, IEEE 802.11-17/0054r2, XP068115161, Jan. 15, 2017, 15 pages.

Ryu et al., "Overall MAC Procedure for WUR," LG Electronics, IEEE 80211-16/1445r1, XP068110861, Nov. 7, 2016, 10 pages.

Office Action issued in Chinese Application No. 201710257732.2 dated Aug. 17, 2020, 10 pages (with English ranslation).

Office Action issued in Chinese Application No. 201710257732.2 dated Feb. 3, 2020, 17 pages (With English Translation).

\* cited by examiner

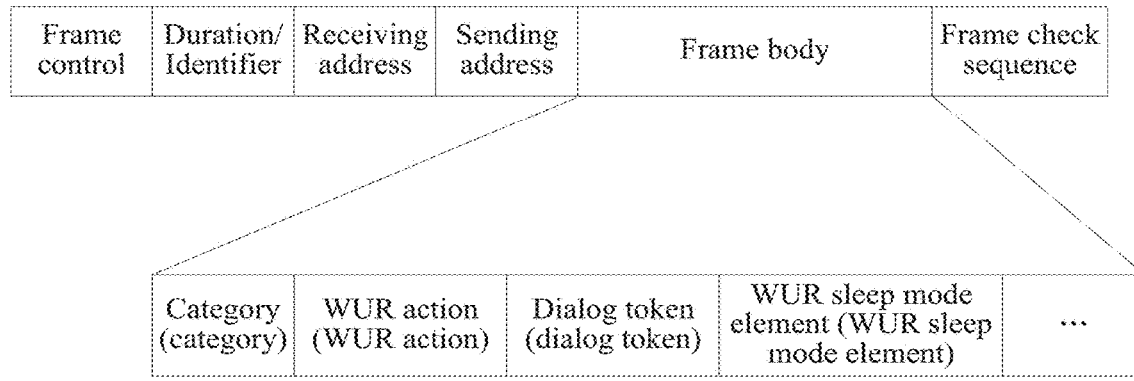
FIG. 8
FIG. 9
FIG. 10
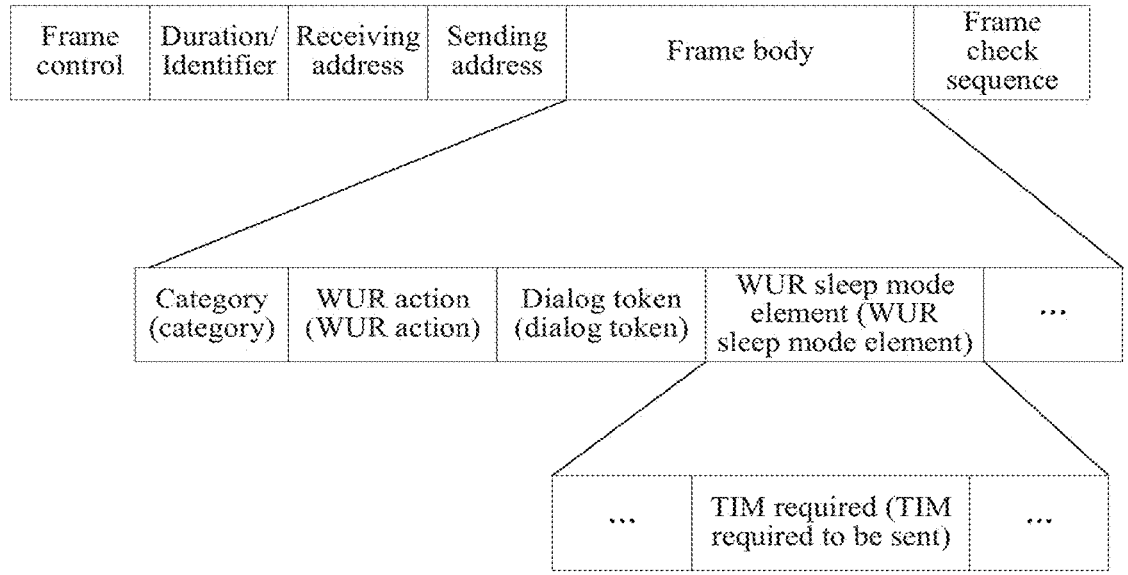
FIG. 11

STATION WAKE-UP METHOD AND STATION

CROSS-REFERENCE TO RELATED APPLICATIONS

This application is a continuation of International Application No. PCT/CN2018/082226, filed on Apr. 8, 2018, which claims priority to Chinese Patent Application No. 201710257732.2, filed on Apr. 19, 2017. The disclosures of the aforementioned applications are incorporated herein by reference in their entireties.

TECHNICAL FIELD

The present invention relates to the field of communications technologies, and in particular, to a station wake-up method and a station.

BACKGROUND

In a wireless fidelity (Wireless Fidelity, Wi-Fi) network, a device wastes a considerable part of energy on listening when no signal is received or sent. Related solutions in the current legacy 802.11 protocols (802.11b/a/g/n/ac, and the like) focus on optimizing a sleep policy of the device. In addition to optimizing the sleep policy, another approach to reducing energy waste of the device is to use a low-power wake-up radio (Wake-up radio, WUR). A station includes a newly added WUR in addition to a legacy 802.11 main transceiver. When the main transceiver enters a deep sleep mode, the low-power WUR wakes up and starts operating. If another station needs to communicate with the station, the another station first sends a wake-up frame (also named as Wake UP packet, WUP) to the WUR in the station, and the WUR wakes up the main transceiver after correctly receiving the WUP sent to the WUR, and performs communication. This technology uses the low-power WUR to replace the main transceiver to listen on a channel when a medium is idle, so that energy waste of the station is effectively reduced. However, how the station integrates enabling a power save mode of the WUR with an existing system is currently not regulated in the industry.

SUMMARY

Embodiments of the present invention provide a station wake-up method and a station, so that a conventional power save mode and a WUR sleep mode can be integrated, and power consumption of the station is reduced.

According to a first aspect, an embodiment of the present invention provides a station wake-up method. The station wake-up method is applied to a station, and the station may include a wake-up receiver and a main transceiver. The station sends a first radio frame to an access point. The first radio frame includes first indication information, the first indication information is used to indicate that the station requests to enter a conventional power save mode, and the conventional power save mode is a mode in which the main transceiver wakes up according to a preset time period and receives a beacon frame sent by the access point.

The station sends a second radio frame to the access point. The second radio frame includes second indication information, where the second indication information is used to indicate that the station requests to enter a WUR sleep mode, and the WUR sleep mode is a mode in which the wake-up receiver of the station wakes up the main transceiver in a doze state when receiving a wake-up frame.

When the station is in both the conventional power save mode and the WUR sleep mode, the wake-up receiver of the station wakes up the main transceiver in the doze state when receiving the wake-up frame, where the main transceiver of the station may does not wake up according to the preset time period. Optionally, that the main transceiver of the station does not wake up according to the preset time period may mean that the main transceiver of the station may wake up, but wake up according to a time different from the preset time period in the conventional power save mode. For example, a wake-up time of the main transceiver is not periodic, or a wake-up time period is a multiple of the preset time period in the conventional power save mode. Alternatively, that the main transceiver of the station does not wake up according to the preset time period may mean that the main transceiver of the station does not wake up, and the main transceiver wakes up only after the wake-up receiver of the station receives the wake-up frame and wakes up the main transceiver.

In a possible design, before the station sends the first radio frame to the access point, the station may further send a listen interval parameter to the access point. A value of the listen interval parameter is a preset value. The listen interval parameter is used to indicate a length of the preset time period in the conventional power save mode. The preset value is used to represent that the main transceiver does not wake up according to the preset time period. Optionally, for the preset value, each of 16 bits of the listen interval parameter is 1, that is, 65535.

In a possible design, the main transceiver does not wake up according to the preset time period. Therefore, downlink service indication information of the station may alternatively be absent from the beacon frame sent by the AP.

In a possible design, the foregoing second radio frame may further include third indication information. The third indication information is used to indicate whether the access point adds the downlink service indication information of the station to the beacon frame.

In a possible design, after the station sends the second radio frame to the access point, the station may further receive a first response frame sent by the access point. The first response frame includes fourth indication information, and the fourth indication information is used to indicate whether the station is allowed to enter the WUR sleep mode.

If the fourth indication information in the first response frame indicates that the station is allowed to enter the WUR sleep mode, the station enters the WUR sleep mode.

In a possible design, when the station needs to disable the WUR sleep mode, the station may send the third radio frame to the access point. The third radio frame includes fifth indication information, and the fifth indication information is used to indicate the station requests to disable the WUR sleep mode.

When receiving the third radio frame, the access point sends a second response frame to the station, and the station receives the second response frame. The second response frame includes sixth indication information, and the sixth indication information is used to indicate whether the station is allowed to disable the WUR sleep mode.

If the sixth indication information in the second response frame indicates that the station is allowed to disable the WUR sleep mode, the station disables the WUR sleep mode. After the station disables the WUR sleep mode, the station is in the conventional power save mode. Further, optionally, the station wakes up according to the preset time period and receives the beacon frame sent by the access point.

According to a second aspect, an embodiment of the present invention provides a station. The station includes a wake-up receiver and a main transceiver. The main transceiver is configured to send a first radio frame to an access point. The first radio frame includes first indication information. The first indication information is used to indicate that the station requests to enter a conventional power save mode, and the conventional power save mode is a anode in which the main transceiver wakes up according to a preset time period and receives a beacon frame sent by the access point.

The main transceiver is further configured to send a second radio frame to the access point. The second radio frame includes second indication information, where the second indication information is used to indicate that the station a wake-up radio WUR sleep mode, and the WUR sleep mode is a mode in which the wake-up receiver wakes up the main transceiver in a doze state when receiving a wake-up frame.

The wake-up receiver is configured to: when the station is in both the conventional power save mode and the WUR sleep mode, receive the wake-up frame and wake up the main transceiver, where the main transceiver does not wake up according to the preset time period.

By implementing the embodiments of the present invention, the station sends the first radio frame to the access point. The first radio frame includes the first indication information, and the first indication information is used to indicate that the station requests to enter the conventional power save mode. The station sends the second radio frame to the access point, and the second radio frame includes the second indication information, where the second indication information is used to indicate that the station requests to enter the WUR sleep mode. When the station is in both the conventional power save mode and the WUR sleep mode, the station does not wake up according to the preset time period, but only wakes up the main transceiver when the wake-up frame is received. In this manner, the newly added WUR sleep mode can be integrated with the conventional power save mode. In addition, the main transceiver does not wake up according to the preset time period, power consumption of the station can be saved.

BRIEF DESCRIPTION OF DRAWINGS

To describe the technical solutions in the embodiments of the present invention or in the prior art more clearly, the following describes the accompanying drawings required for describing the embodiments of the present invention or the prior art.

FIG. 8 is a schematic structural diagram of a WUR sleep mode request frame according to an embodiment of the present invention;

FIG. 9 is a schematic structural diagram of a WUR sleep mode element according to an embodiment of the present invention;

FIG. 10 is a schematic structural diagram of a WUR sleep mode response frame according to an embodiment of the present invention;

FIG. 11 is a schematic structural diagram of another WUR sleep mode request frame according to an embodiment of the present invention.

DESCRIPTION OF EMBODIMENTS

The following describes the embodiments of the present invention with reference to the accompanying drawings in the embodiments of the present invention.

A main transceiver of the embodiments of the present invention may be an 802.11 main transceiver.

A wake-up receiver of the embodiments of the present invention may be a newly added wake-up radio WUR part of a station.

The embodiments of the present invention may be applied to a wireless local area network (Wireless Local Area Network, WLAN). Currently, standards used in the WLAN are the Institute of Electrical and Electronics Engineers (Institute of Electrical and Electronics Engineers, IEEE) 802.11 family. The WLAN may include a plurality of basic service sets (Basic Service Set, BSS), each BSS may include one access point (Access Point, AP) and a plurality of stations (Station, STA) associated with the AP.

The AP is also referred to as a wireless access point, a hotspot, or the like. The AP is an access point for a mobile user to access a wired network, and is mainly deployed in a home, inside a building, and inside a park with a typical coverage radius ranging from dozens of meters to hundreds of meters. Certainly, the AP may alternatively be deployed outdoors. The AP is equivalent to a bridge that connects a wired network and a wireless network. A major function of the AP is to connect various wireless network clients and then connect the wireless network to Ethernet. Specifically the AP may be a terminal device or a network device with a Wi-Fi chip. Optionally, the AP may be a device that supports an 80211 ax standard. Further, optionally, the AP may be a device that supports a plurality of WLAN standards such as 802.11ac, 802.11n, 802.11g, 802.11b, and 802.11a.

The STA may be a wireless communications chip, a wireless sensor, or a wireless communications terminal. For example, the STA may be a mobile phone supporting a Wi-Fi communication function, a tablet computer supporting a Wi-Fi communication function, a set-top box supporting a Wi-Fi communication function, a smart TV supporting a Wi-Fi communication function, a smart wearable device supporting a communication function, an in-vehicle communications device supporting a Wi-Fi communication function, or a computer supporting a Wi-Fi communication function. Optionally, the STA may support the 802.11 ax standard. Further, optionally, the station supports a plurality of WLAN standards such as 80211 ac, 802.11 in, 802.11g, 802.11b, and 802.11a.

Figure 1:
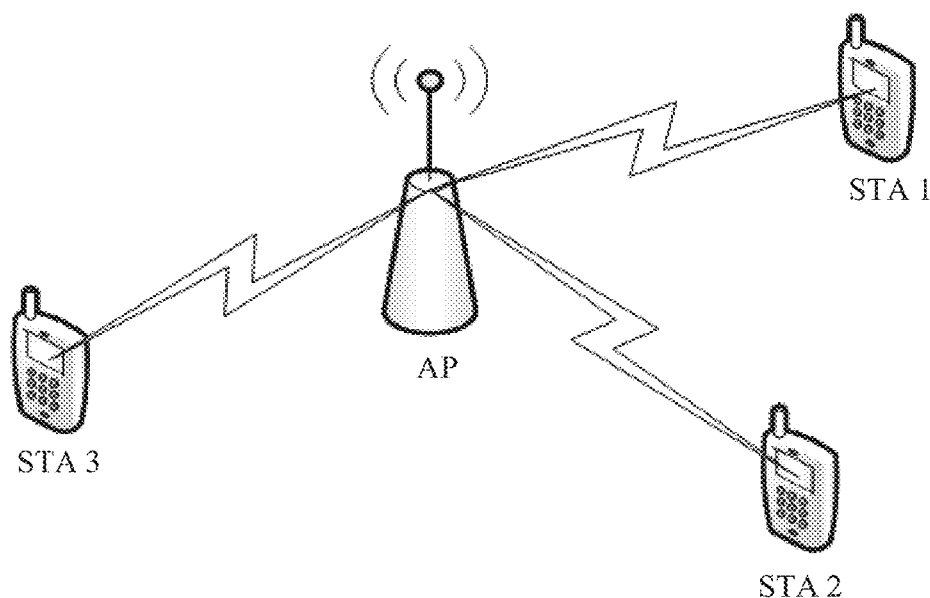
FIG. 1 is a diagram of an application scenario according to an embodiment of the present invention.

FIG. 1 is an application scenario diagram of a BSS according to an embodiment of the present invention. The BSS includes an AP, a STA 1. a STA 2, and a STA 3. The STA 1, the STA 2, and the STA 3 are associated with the AP. The station in this embodiment of the present invention may be any STA in FIG. 1, and the access point may be the AP in FIG. 1. It should be noted that a quantity of STAs in this embodiment of the present invention is only an example.

Figure 2A:
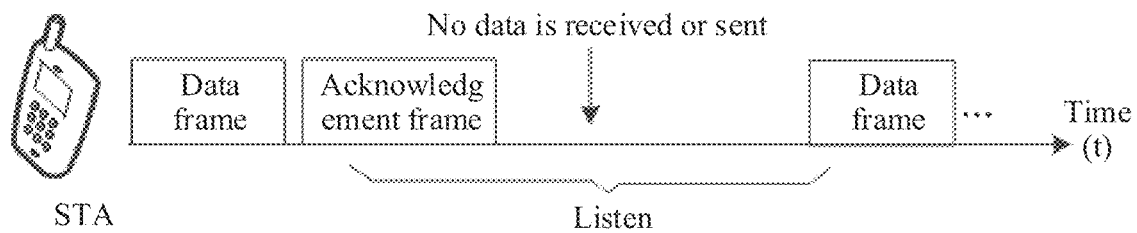
FIG. 2a is a schematic diagram of data listening in the prior art.
Figure 2B:
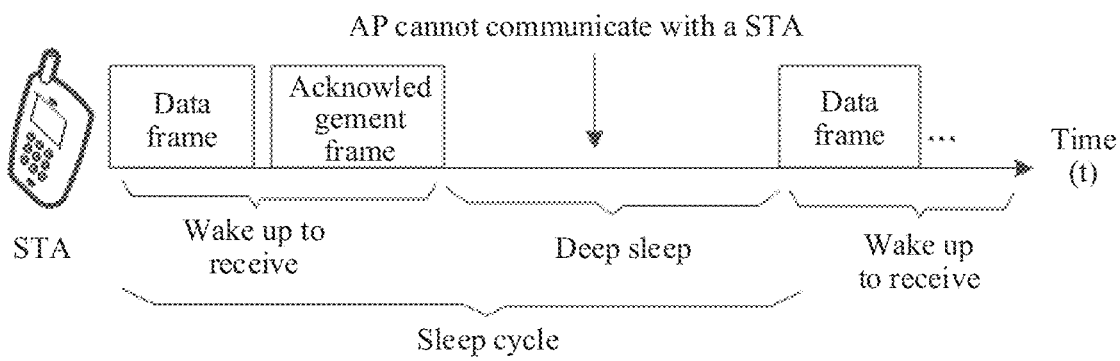
FIG. 2b is a schematic diagram of data listening in the prior art.

In a Wi-Fi network, the station wastes a considerable part of energy on listening when no signal is received or sent. Related solutions in the current legacy 802.11 protocols (802.11b/a/g/n/ac, and the like) focus on optimizing a sleep policy of the station. As shown in FIG. 2a, when the STA does not receive or send a message (for example, at a stage that no data is received or sent), if the STA continuously listens on a channel, considerable energy is consumed. Therefore, a sleep schedule is introduced in FIG. 2b, so that the STA can enter a deep sleep (Deep Sleep) mode when no data is received or sent, to reduce energy consumption caused by continuously listening on the channel. However, when the STA is in a deep sleep mode, the AP cannot communicate with the STA, data transmission between the AP and the STA may be performed only after the STA wakes up. Consequently, a specific latency may be caused. To avoid a high latency caused by the sleep schedule, the STA usually wakes up according to a preset time period and a specific sleep policy, to check whether any-data needs to be received. However, this reduces sleep efficiency of the STA because much energy is also consumed when no useful data needs to be received and sent after the STA wakes up according to the preset time period.

In addition to optimizing the sleep policy, another technology approach to reducing energy waste caused by listening on the channel by the station is to use a low-power wake-up receiver, and the wake-up receiver may be also referred to as a wake-up radio (Wakeup radio, WUR). As a wireless local area network WLAN standard evolves, the IEEE 802.11 working group is preparing research and formulation of 802.11 standards in which a technology with the WUR as its core is used to reduce power consumption. An SG (Study Group, study group) for the 802.11 standards was set up at the IEEE in June 2016.

Figure 3:
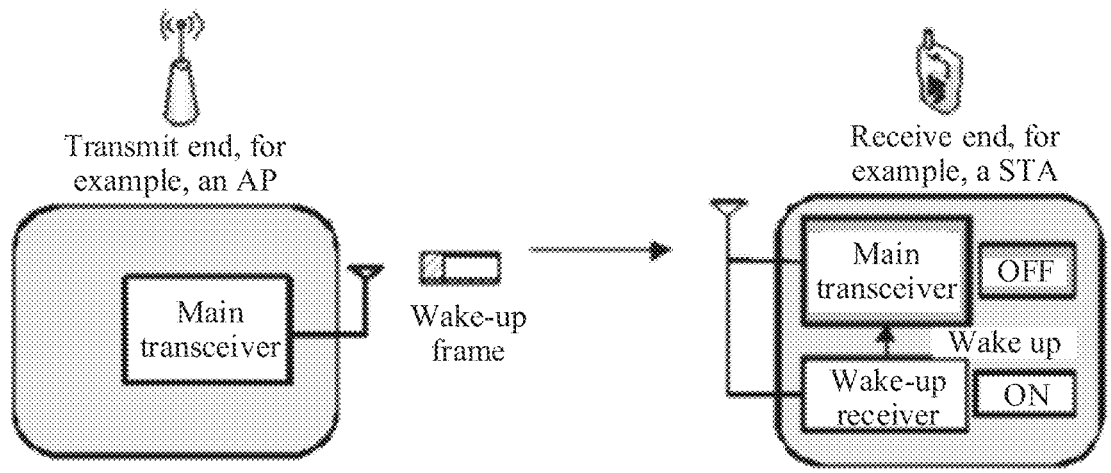
FIG. 3 is a possible schematic structural diagram of a low-power wake-up receiver according to an embodiment of the present invention.

In the technology with the WUR as its core, a low-power wake-up receiver is newly added to a receive end device (for example, a STA) that includes a legacy 802.11 main transceiver. As shown in FIG. 3, when the 802.11 main transceiver enters a deep sleep mode, die low-power wake-up receiver wakes up and starts operating. If another device (for example, the AP in FIG. 3) needs to communicate with a device that includes a wake-up receiver and an 802.11 main transceiver (for example, the STA in FIG. 3), the AP first sends a wake-up frame (also named as Wake UP packet, WUP). After correctly receiving the WUP sent to the wake-up receiver, the wake-up receiver wakes up the 802.11 main transceiver of the STA, and then enters a doze state. In this case, the AP communicates with the 802.11 main transceiver that is woken up. After completing communication with the AP, the 802.11 main transceiver of the STA enters a doze state, and in the meantime, the WUR wakes up and again starts listening whether there is a WUP sent to the WUR, so as to wake up the 802.11 main transceiver.

In this technology, the low-power wake-up receiver is used to replace the 802.11 main transceiver to listen on the channel when a medium is idle (energy consumption of the WUR in a listening state or a receiving state herein approximately ranges from 0.1% to 1% of energy consumption of the 802.11 main transceiver, that is, less than 100 μW), so that energy waste of the device can be efficiently reduced. Therefore, in this embodiment of the present invention, a power save mode based on the wake-up receiver of the STA is referred to as a WUR sleep mode, that is, when receiving the wake-up frame, the wake-up receiver of the station wakes up the main transceiver in the doze state, so as to avoid energy waste of listening on the channel by the main transceiver.

To implement low-power consumption, the wake-up receiver requires a relatively simple and less complex circuit structure, frame structure design (for example, the WUP), and the like. For example, a circuit structure of the wake-up receiver may include only an energy detection (energy detection) part and a radio frequency (radio frequency, RF) part. Therefore, some complex modulation schemes cannot be demodulated. In this case, the WUP may be modulated in a simple binary on-off keying (On-Off Keying, OOK) modulation scheme, binary phase shift keying (Binary Phase Shift Keying, BPSK) scheme, or frequency shift keying (Frequency Shift Keying, FSK) scheme.

Figure 4A:
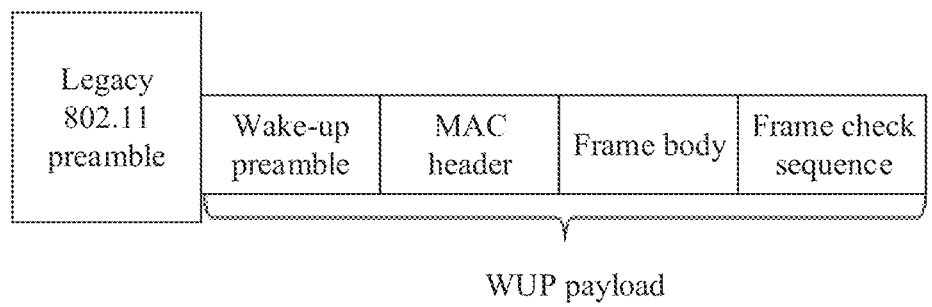
FIG. 4a is a schematic diagram of a WUP frame structure according to an embodiment of the present invention.

Optionally, a possible WUP frame structure is shown in FIG. 4a. A front part is a legacy 802.11 preamble (Legacy 802.11 preamble). The legacy 802.11 preamble may be learned by another peripheral 802.11 device (the 802.11 device that detects the legacy 802.11 preamble by listening may not preempt the channel within a period of time), and is used to protect a subsequent part of the wake-up frame from interference by a legacy 802.11 device. The legacy 802.11 preamble is followed by a payload (payload) part of the WUP, namely, a WUP payload part. The WUP payload part is modulated in an OOK modulation scheme and can be only learned by the wake-up receiver. The WUP payload part may include a wake-up preamble (Wake-Up Preamble), a media access control (Media Access Control, MAC) header, a frame body, and a frame check sequence (Frame Check Sequence, FCS). The wake-up preamble is used to identify a WUP signal, the MAC header includes a WUR ID, and the WUR ID is used to distinguish between different WURs. The frame body is used to carry some other information to ensure that received data is the same as sent data. WUR ID information herein may be a partial or complete station association identifier, a WUR identifier assigned by the AP to the station, a MAC address of the station or part of the MAC address, or other information that may be used to distinguish between WURs of different stations. In addition, the WUP payload part may be transmitted by using a narrowband. To be specific, the WUP payload part is different from the legacy 802.11 preamble that is transmitted based on a basic transmission unit with 20 MHz bandwidth, for example, the narrowband may be 1 MHz, 2 MHz, 4 MHz, 8 MHz, or 16 MHz. The WUP payload part may be alternatively transmitted based on a basic transmission unit with 20 MHz bandwidth.

Figure 4B:
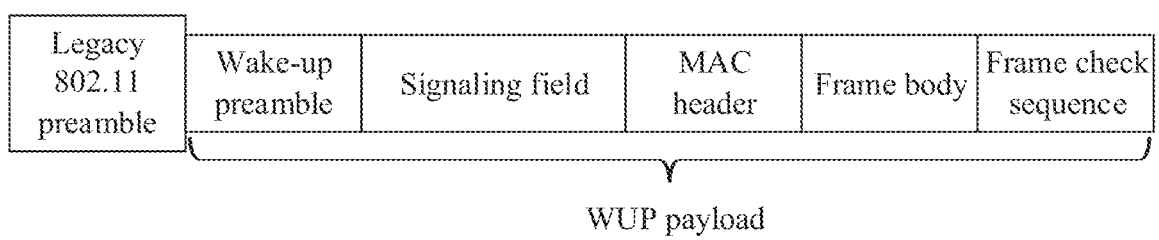
FIG. 4b is a schematic diagram of another WUP frame structure according to an embodiment of the present invention.

FIG. 4b shows another possible WUP frame structure. The WUP frame structure includes a legacy 802.11 preamble, a wake-up preamble, a signaling field (used to carry some physical layer signaling, for example, an AP identifier, a WUR ID, and a modulation and coding indication), a MAC header, a frame body, and a frame check sequence.

Figure 5:
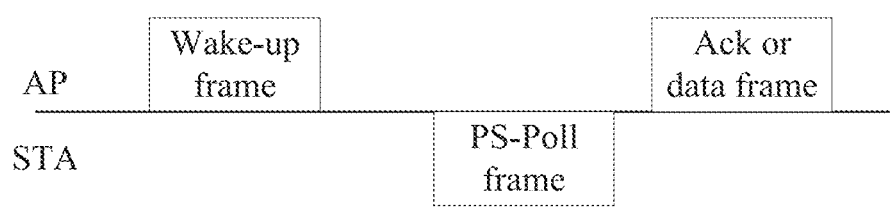
FIG. 5 is an interaction diagram between an AP and a STA according to an embodiment of the present invention.

In a specific wake-up radio communication process, as shown in FIG. 5, an AP sends a wake-up frame to a single station STA. After receiving the wake-up frame, the STA sends a PS-Poll frame or an acknowledgement frame to the AP to notify the AP that the STA has woken up, and then the AP replies with an ACK frame or directly transmits a data frame to the STA. In addition, after the STA is woken up, the AP may alternatively send a data frame directly to the station without waiting for the STA to send the PS-Poll frame.

It can be learned from the foregoing that when a wake-up receiver is configured in the station and the station operates based on the wake-up receiver, energy consumption of the station is far less than that of a station that always operates based on an 802.11 main transceiver. In this embodiment of the present invention, an power save mode in which a station operates based on a wake-up receiver is referred to as a NUR sleep mode. When the station operates in the WUR sleep mode, the main transceiver is in a doze state. When receiving a wake-up frame, the wake-up receiver wakes up the main transceiver in the doze state. When the main transceiver wakes up, the main transceiver of the station may communicate with an access point.

However, currently, the station is in a conventional power save mode, that is, the main transceiver of the station wakes up according to a preset time period. After the main transceiver of the station wakes up, the main transceiver may receive a beacon frame sent by the AP, and the beacon frame includes downlink service indication information of the station.

The station in which the wake-up receiver is configured can operate based on either the conventional power save mode or the WUR sleep mode, and how to integrate these two power save modes is a technical problem to be resolved in the embodiments of the present invention.

Based on the foregoing technical problem, a solution provided in the embodiments of the present invention is as follows: When the station is in both the conventional power save mode and the WUR sleep mode, the main transceiver of the station no longer wakes up according to the preset time period, but detects whether the wake-up frame is received. When receiving the wake-up frame, the main transceiver of the station wakes up the main transceiver in the doze state. For that the main transceiver no longer wakes up according to the preset time period, does not wake up according to the preset time period herein may does not wake up, or may be waking up, but the waking up according to a time different from the preset time period. In this way, the station at which the wake-up receiver is configured can not only be compatible with the conventional power save anode, but also reduce power consumption of the station.

Figure 6:
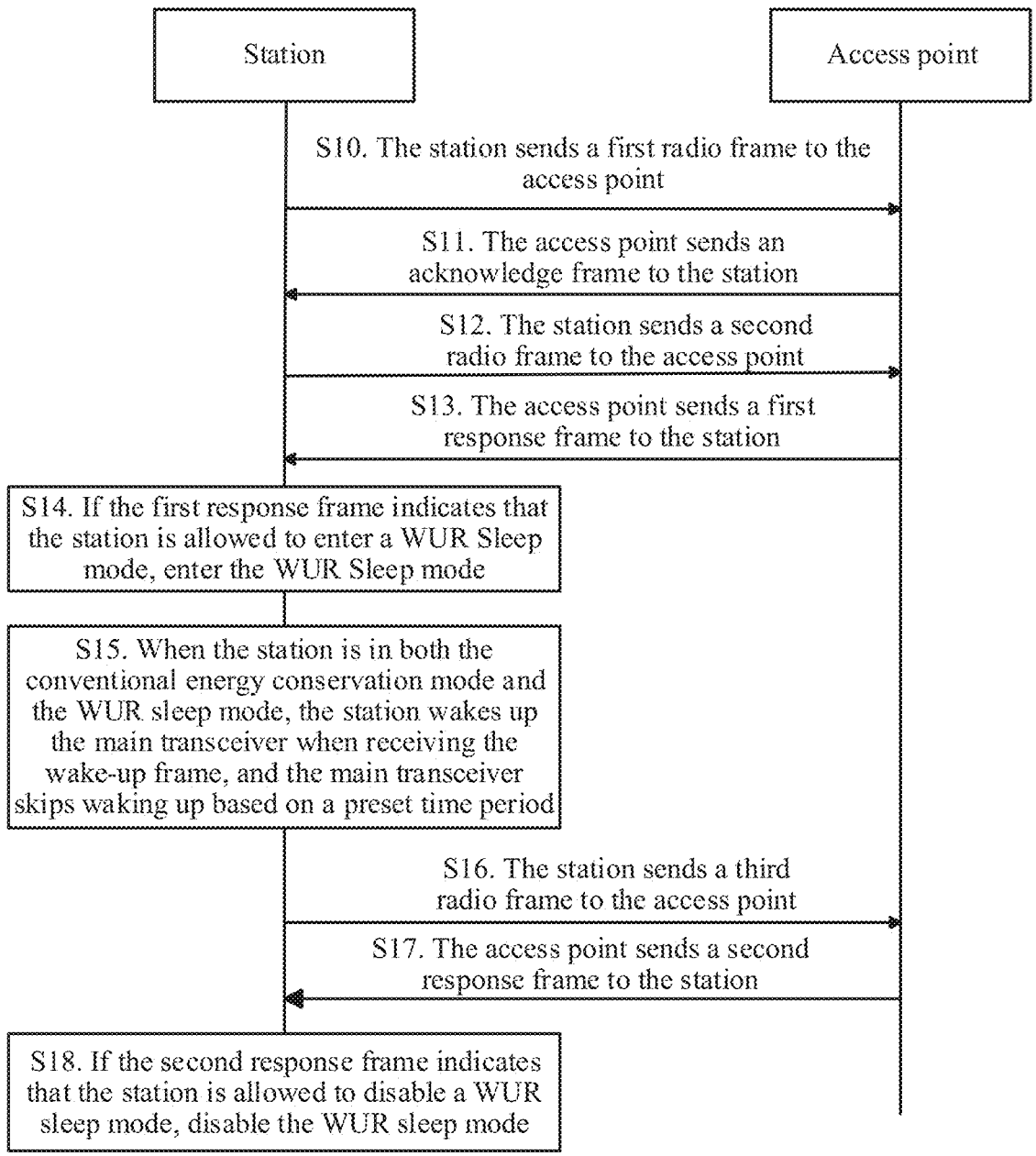
FIG. 6 is an interaction flowchart of a station wake-up method according to an embodiment of the present invention.

FIG. 6 is an interaction flowchart of a station wake-up method according to an embodiment of the present invention. As shown in the figure, the station wake-up method in this embodiment of the present invention may include the following steps.

S10. A station sends a first radio frame to an access point. The first radio frame includes first indication information, the first indication information is used to indicate that the station requests to enter a conventional power save mode, and the conventional power save mode is a mode in which a main transceiver wakes up according to a preset time period and receives a beacon frame sent by the access point.

S11. The access point sends an acknowledgement frame to the station.

Optionally, after receiving the acknowledgement frame sent by the access point, the station enters a conventional power save mode.

In an embodiment, the station has three operating modes and two operating states. The three operating modes are an active mode, a conventional power save mode, and a WUR sleep mode, and the two operating states are an awake state and a doze state. When a STA operates in the active mode, a main transceiver of the STA always remains in the awake state. When the STA operates in the conventional power save mode, the main transceiver of the STA may be in the awake state or the doze state. When the STA operates in the WUR sleep mode, the main transceiver of the STA is in the doze state, and when receiving the wake-up frame, the wake-up receiver of the STA wakes up the main transceiver in the doze state. When the main transceiver is woken up, the main transceiver may communicate with the access point.

The STA may switch between the active mode and the conventional power save mode. The STA sends a first radio frame to the AP, where the first radio frame may be an 802.11 frame. The first radio frame includes first indication information, and the first indication information is used to indicate that the STA requests to enter the conventional power save mode.

Figure 7:
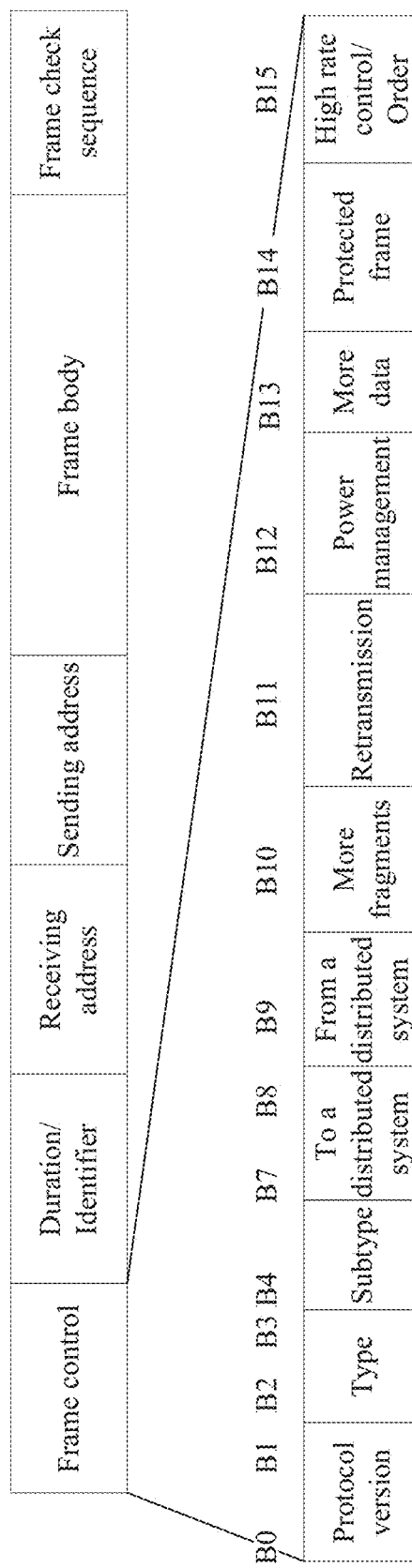
FIG. 7 is a schematic structural diagram of a first radio frame according to an embodiment of the present invention.

Optionally, FIG. 7 is a schematic diagram of a possible frame structure of a first radio frame according to this embodiment of the present invention. As shown in the figure, if a value of a power management (power management) field in a frame control (Frame control) field of the first radio frame is set to 1, it indicates that the STA expects to switch from the active mode to the conventional power save mode. On the contrary, if a value of the power management field of the frame control field of the first radio frame is set to 0, it indicates that the STA expects to switch from the conventional power save mode to the active mode.

When the STA is in the conventional power save mode, the STA can also switch between the awake state and the doze state. A switch method may be as follows: The STA wakes up according to the preset time period to receive the beacon frame. When the AP needs to send a downlink service to the STA, the AP adds downlink service indication information related to the STA to a traffic indication map (Traffic Indication Map, TIM) information element in the beacon frame, and notifies the STA that there is a downlink service to be received. After the STA wakes up according to the preset time period, when the STA expects to notify the AP that the STA has switched from the doze state to the awake state, the STA may send a PS-Poll frame to the AP to indicate that the STA is in the awake state, so that the AP sends the downlink service to the STA. In a process in which the AP sends a downlink data frame to the STA, the AP may set a value of a more data (more data) field in a frame control field of a last downlink frame to 0, and this indicates that no data is to be sent later. After receiving the downlink data frame, the STA may reply with an acknowledgement frame, and the AP may learn that the STA is back in the doze state again. Subsequently, the STA wakes up according to the preset time period again, receives the beacon frame sent by the AP, and parses the beacon frame to obtain whether the downlink service indication information exists.

It should be noted that an execution basis of step S10 to step S11 may be that the STA is in the active mode, and when receiving the first radio frame, the STA may switch from the active mode to the conventional power save mode. Alternatively, an execution basis of step S10 to step S11 may be that the STA is in the WUR sleep mode. To be specific, the STA first performs steps S12 to S14 to switch from the active mode to the WUR sleep mode, and then performs steps S10 to S11 to enter the conventional power save mode.

S12. The station sends a second radio frame to the access point. The second radio frame includes second indication information, where the second indication information is used to indicate that the station requests to enter a wake-up radio WUR sleep mode, and the WUR sleep mode is a mode in which a wake-up receiver wakes up the main transceiver in a doze state when receiving a wake-up frame.

S13. The access point sends a first response frame to the station, where the first response frame includes fourth indication information, and the fourth indication information is used to indicate whether the station is allowed to enter the WUR sleep mode.

S14. The station receives the first response frame sent by the access point, and if the fourth indication information indicates that the station is allowed to enter the WUR sleep mode, the station enters the WUR sleep mode.

It should be noted that the station may first perform steps S10 to S11 to switch from the active mode to the conventional power save mode, and then perform steps S12 to S14 to enter the WUR sleep mode, that is, in this case the station is in both the conventional power save mode and the WUR sleep mode. Alternatively, the station may first perform steps S12 to S14 to switch from the active mode to the WUR sleep mode, and then perform steps S10 to S11 to enter the conventional power save mode, that is, in this case the station is in both the conventional power save mode and the WUR sleep mode. This embodiment of the present invention imposes no limitation on a sequence of performing steps of the station.

Further, optionally, the station may alternatively perform steps S12 to S14 to enter the WUR sleep mode, and then perform step S16 to step S18 directly. In other words, the station skips indicating, to the access point, that the station requests to enter the conventional power save mode.

In an embodiment, when the STA needs to enter the WUR sleep mode, the STA needs to send a second radio frame to the access point, and the second radio frame may be an 802.11 frame. The second radio frame includes second indication information, where the second indication information is used to indicate that the STA requests to enter the WUR sleep mode. The WUR sleep mode in this embodiment of the present invention may be that the main transceiver of the STA is in the doze state. When receiving the wake-up frame, the wake-up receiver the STA wakes up the main transceiver in the doze state, and when the main transceiver wakes up, the main transceiver may communicate with the AP.

Optionally, the second radio frame is a WUR sleep mode request frame (WUR sleep mode Request Frame). The STA sends the WUR sleep mode request frame to the AP, and the WUR sleep mode request frame carries indication information I1 indicating that the STA requests to enter the WUR sleep mode.

The AP receives the indication information I1, carried in the WUR sleep mode request frame, indicating that the STA requests to enter the WUR sleep mode, and sends a first response frame to the STA. The first response frame includes fourth indication information, and the fourth indication information is used to indicate whether the STA is allowed to enter the WUR sleep mode. Optionally, the first response frame may be a WUR sleep mode response frame (WUR sleep mode response frame), and the WUR sleep mode response frame carries indication information I2 indicating whether the STA is allowed to enter the WUR sleep mode.

The STA receives the WUR sleep mode response frame sent by the AP, and if a value of the indication information I2 indicates that the STA is allowed to enter the WUR sleep mode, the STA enters the WUR sleep mode.

Optionally, FIG. 8 is a schematic diagram of a possible frame structure of the WUR sleep mode request frame according to this embodiment of the present invention. A type of the WUR sleep mode request frame is a management frame (Type value=00), and a subtype is an action frame (subtype value=1101). A frame body includes a category (Category) field, a WUR action (WUR Action) field, and a dialog token (Dialog Token) field, and may further include a WUR sleep mode element (WUR sleep mode element) field.

A value of the category (Category) field corresponds to "WUR", which indicates that an action frame of this type is related to the WUR. A value of the WUR action (WUR Action) field corresponds to "WUR sleep mode request", which indicates that a type of this WUR action frame is the WUR sleep mode request frame. The dialog token (Dialog Token) field is a non-zero value selected by the STA, which is used to indicate a dialog that includes a pair of one request frame and one response frame. The WUR sleep mode element (WUR sleep mode element) may include an action type field. FIG. 9 is a schematic structural diagram of the WUR sleep mode element according to this embodiment of the present invention. As shown in the figure, the WUR sleep mode element includes an action type field, and a value of the action type field may represent a type of an action, for example, entering a WUR sleep mode (Enter WUR sleep mode) or exiting a WUR sleep mode (Exit WUR sleep mode).

As shown in FIG. 9, when the STA requests to enter the WUR sleep mode, a value of an action type field in a WUR sleep mode request frame sent by the STA should correspond to "Enter a WUR sleep mode" (Enter WUR sleep mode). On the contrary, when the STA requests to disable the WUR sleep mode, a value of an action type field in a WUR sleep mode request frame sent by the STA should correspond to "Exit a WUR sleep mode" (Exit WUR sleep mode). The value of the action type field carried in the WUR sleep mode request frame in this step should correspond to entering the WUR sleep mode. The following table shows definitions of values of the action type Action type field.

| Name | Action type value |
| --- | --- |
| . . . | |
| Enter a WUR sleep mode | 2 |
| Exit a WUR sleep mode | 3 |
| . . . | |

Optionally, the WUR sleep mode element may further include some parameters related to the WUR sleep mode, for example, whether WUR is always enabled, a cycle of enabling the WUR, and duration of each enabling.

Optionally, a frame structure of the WUR sleep mode response frame is similar to that in FIG. 8. A difference lies in that a value of the WUR action (WUR Action) field corresponds to a "WUR sleep mode response", which indicates that a type of the WUR action frame is a WUR sleep mode response frame. In addition, the WUR sleep mode element in the WUR sleep mode response frame may further include a WUR sleep mode response status (WUR sleep mode response status) field to indicate whether the AP agrees to a WUR sleep mode request initiated by the STA.

FIG. 10 is a schematic structural diagram of the WUR sleep mode element in the WUR sleep mode response frame according to this embodiment of the present invention. As shown in the figure, the WUR sleep mode element in the WUR sleep mode response frame includes a WUR sleep mode response status field in addition to the fields shown in FIG. 9. The following table shows definitions of values of the WUR sleep mode response status field.

| Value | Description |
|---|---|
| 0 | Enter WUR sleep mode accept (Accept to enter a WUR sleep mode) |
| 1 | Reject. An AP cannot perform a requested operation |
| ... | |

It may be understood that, when the value of the WUR action (WUR Action) field in FIG. 8 corresponds to the "WUR sleep mode request", the frame structure is a WUR sleep mode request frame, and the frame structure includes the foregoing indication information I1; or when the value of the WUR action (WUR Action) field in FIG. 8 corresponds to the "WUR sleep mode response", the frame structure is a WUR sleep mode response frame, and the frame structure includes the foregoing indication information I2.

S15. When the station is in both the conventional power save mode and the WUR sleep mode, the station wakes up the main transceiver when receiving the wake-up frame, and the main transceiver does not wake up according to the preset time period.

In an embodiment, when the STA is in both the conventional power save mode and the WUR sleep mode, the main transceiver of the STA does not need to wake up periodically to receive a beacon frame, but the STA waits for the AP to send a wake-up frame. When receiving the wake-up frame, the wake-up receiver of the STA wakes up the main transceiver in the doze state. It should be noted that, that the main transceiver does not wake up according to the preset time period may include that the main transceiver does not wake up, or the main transceiver may wake up, but a wake-up time of the main transceiver is no longer according to the preset time period in the conventional power save mode. For example, a wake-up time of the main transceiver is not periodic, or a period of the wake-up time of the main transceiver is greater than or less than the preset time period in the conventional power save mode.

Optionally, that the STA is in both the conventional power save mode and the WUR sleep mode may mean that the STA enables both the conventional power save mode and the WUR sleep mode. In other words, the STA indicates, to the AP, that the STA requests to enter the conventional power save mode, and power save the STA indicates, to the AP, that the STA further requests to enter the WUR sleep mode during a period in which the STA skips indicating, to the AP, that the STA disables the conventional power save mode.

In this embodiment of the present invention, after the STA enters the WUR sleep mode, even if the STA is also in the conventional power save mode, the STA does not need to wake up according to the preset time period to receive the beacon frame. This embodiment of the present invention removes a limitation that the STA needs to wake up according to the preset time period in the conventional power save mode to receive the beacon frame.

Optionally, although the STA does not wake up according to the preset time period to receive the beacon frame, the AP may still add downlink service indication information of the STA to a TIM information element in the beacon frame. After the STA wakes up, the STA can also receive the downlink service indication information in the beacon frame. It should be noted that if the STA does not wake up, the STA does not receive the downlink service indication information in the beacon frame.

Optionally, the STA does not wake up according to the preset time period to receive the beacon frame. To save overheads, the AP may alternatively not need to add the downlink service indication information of the STA to a TIM information element in the beacon frame. In this case, even if the STA wakes up to receive the beacon frame, the STA cannot obtain the downlink service indication information of the STA. In this embodiment, the AP does not need to add the downlink service indication information of the STA to the TIM information element in the beacon frame, and therefore overheads are reduced.

Optionally, when the STA is in both the conventional power save mode and the WUR sleep mode, the STA may wake up according to the preset time period, or may not wake up according to the preset time period. Further, optionally, the STA may indicate, to the AP, whether the STA wakes up according to the preset time period, so that the AP determines whether to add the downlink service indication information of the STA to the TIM information element in the beacon frame. Alternatively, the STA may directly indicate, to the AP, whether the AP needs to add the downlink service indication information of the STA to the TIM information element in the beacon frame. For example, the foregoing second radio frame used to indicate that the STA requests to enter the WUR sleep mode includes third indication information, and the third indication information is used to indicate whether the AP needs to add the downlink service indication information of the STA to the TIM information element in the beacon frame. Optionally, with reference to the foregoing steps S12 to S14, a specific step in which the STA indicates, to the AP, whether the downlink service indication information is carried may include the following two steps.

Step 1: The STA sends a WUR sleep mode request frame (WUR sleep mode Request Frame) to the AP, where the WUR sleep mode request frame carries indication information I1 indicating that the STA requests to enter the WUR sleep mode. In addition, the WUR sleep mode request frame carries indication information I3, where the indication information I3 is used to indicate whether the STA requires the AP to add the downlink service indication information of the STA to the TIM information element in the beacon frame. Optionally, as shown in FIG. 11, the indication information I3 may be located in an indication information field of the TIM information element (TIM required) in the WUR sleep mode element in FIG. 11, and a frame structure in FIG. 11 is the WUR sleep mode request frame.

Step 2: After receiving the WUR sleep mode request frame, the AP obtains the indication information I1 indicating that the STA requests to enter the WUR sleep mode, and the indication information I3. The AP sends a WUR sleep mode response frame (WUR sleep mode response frame) to the STA, and the sleep mode response frame carries indication information I2 indicating whether the STA is allowed to enter the WUR sleep mode.

If a value of the indication information I2 indicates that the STA is allowed to enter the WUR sleep mode, the STA does not need to wake up periodically to receive the beacon frame, but waits for the AP to send a wake-up frame to the STA. In addition, if a value of the indication information I3 indicates that the STA requires the AP to add the downlink service indication information of the STA to the TIM information element in the beacon frame, the AP needs to add the downlink service indication information of the STA to the TIM information element in the beacon frame. If a value of the indication information I3 indicates that the STA does not require the AP to add the downlink service indication information of the STA to the TIM information element in the beacon frame, the AP does not need to add the downlink service indication information of the STA to the TIM information element in the beacon frame.

Optionally, before the STA operates in the conventional power save mode (that is, before step S10 is performed), the STA needs to send a listen interval (listen Interval) parameter to the AP, where the listen interval parameter is used to indicate a length of a preset time period in which the STA wakes up to receive the beacon frame. To ensure that the STA power save does not need to wake up periodically in the conventional power save mode and the WUR sleep mode to receive the beacon frame, a value of the listen interval parameter may be set to a preset value. The preset value is a special value (for example, each of 16 bits of the listen interval parameters is 1, that is, 65535). The preset value is used to indicate that the STA does not wake up to receive the beacon frame, or indicate that a period in which the STA wakes up to receive the beacon frame is infinite. When detecting that the value of the listen interval parameter is the preset value, the AP may not need to add the downlink service indication information of the STA to the TIM information element in the beacon frame.

S16. The station sends a third radio frame to the access point, where the third radio frame includes fifth indication information, and the fifth indication information is used to indicate that the station requests to disable the WUR sleep mode.

S17. The access point sends a second response frame to the station, where the second response frame includes sixth indication information, and the sixth indication information is used to indicate whether the station is allowed to disable the WUR sleep mode.

S18. The station receives the second response frame sent by the access point, and if the sixth indication information indicates that the station is allowed to disable the WUR sleep mode, the station disables the WUR sleep mode.

In an embodiment, when the STA needs to disable the WUR sleep mode, the STA may send a third radio frame to the access point, where the third radio frame includes the fifth indication information, and the fifth indication information is used to indicate that the STA disables the WUR sleep mode. Optionally, the third radio frame may be the WUR sleep mode request frame of a same type as the WUR sleep mode request frame in step S11. A frame structure diagram of the third radio frame may be shown in FIG. 8. A structure of the WUR sleep mode element is shown in FIG. 9. The WUR sleep mode element (WUR sleep mode element) may include an action type field, and a value of the action type field may represent a type of an action, for example, entering the WUR sleep mode (Enter WUR sleep mode) or exiting the WUR sleep mode (Exit WUR sleep mode). In the third radio frame, when the STA requests to disable the WUR sleep mode, a value of the action type field in the WUR sleep mode request frame sent by the STA should correspond to "Exit a WUR sleep mode" (Exit WUR sleep mode). Definitions of values of the action type field are shown in the following table:

| Name | Action type value |
|---|---|
| ... | |
| Enter a WUR sleep mode | 2 |
| Exit a WUR sleep mode | 3 |
| ... | |

After the AP receives the third radio frame sent by the STA, the AP sends the second response frame to the STA. The second response frame includes sixth indication information, where the sixth indication information is used to indicate whether the station is allowed to disable the WUR sleep mode. Optionally, a frame structure of the second response frame in this embodiment of the present invention may be similar to the frame structure of the first response frame in step S13, that is, the second response frame may also be the WUR sleep mode response frame. FIG. 10 is a schematic structural diagram of a WUR sleep mode element in a WUR sleep mode response frame according to an embodiment of the present invention. A difference between the second response frame and the first response frame lies in that the value of the WUR sleep mode response status field is used to indicate whether the STA is allowed to disable the WUR sleep mode. The following table shows definitions of values of the WUR sleep mode response status field.

| Value | Description |
|---|---|
| 0 | Exit a WUR sleep mode accept (Accept to exit a WUR sleep mode) |
| 1 | Reject. An AP cannot perform a requested operation |
| ... | |

The STA receives the second response frame sent by the AP, and if the sixth indication information in the second response frame indicates that the STA is allowed to disable the WUR sleep mode, the STA may disable the WUR sleep mode.

It should be noted that if the STA is in both the WUR sleep mode and the conventional power save mode, when the WUR sleep mode is disabled, the STA is in the conventional power save mode. The STA operates according to the conventional power save mode again, to be specific, the STA wakes up according to the preset time period and receives the beacon frame sent by the AP.

In addition, if the STA is only in the WUR sleep mode, when the WUR sleep mode is disabled, the STA switches to an active mode. In other words, the main transceiver is always in the awake state, and the AP may communicate with the STA.

By implementing this embodiment of the present invention, the station sends the first radio frame to the access point. The first radio frame includes the first indication information, and the first indication information is used to indicate that the station requests to enter the conventional power save mode. The station sends the second radio frame to the access point, the second radio frame includes the second indication information, where the second indication information is used to indicate that the station requests to enter the WUR sleep mode. When the station is in both the conventional power save mode and the WUR sleep mode, the station does not wake up according to the preset time period, but only wakes up the main transceiver when the wake-up frame is received. In this manner, the newly added WUR sleep mode can be integrated with the conventional power save mode. In addition, the main transceiver does not wake up according to the preset time period, power consumption of the station can be reduced.

In another embodiment, when the station is in the WUR sleep mode, the station cannot operate in the conventional power save mode. In other words, a power management field in the radio frame sent by the station becomes a reserved field, and the station cannot request to enter the conventional power save mode by setting a value of the power management field in the radio frame to 1. Optionally, the AP does not need to add the downlink service indication information of the station to the beacon frame, either.

Figure 12:
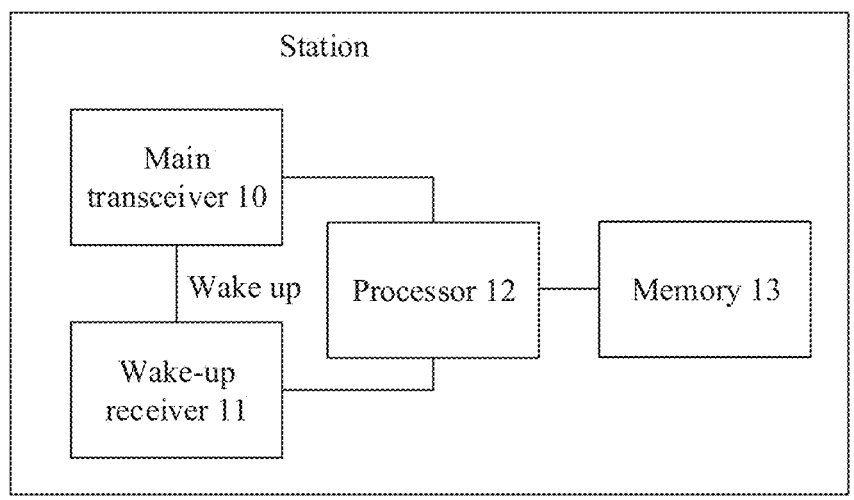
FIG. 12 is a schematic structural diagram of a station according to an embodiment of the present invention.

FIG. 12 is a schematic structural diagram of a station according to an embodiment of the present invention. As shown in the figure, the station in this embodiment of the present invention includes a main transceiver 10, a wake-up receiver 11, a processor 12, and a memory 13. The processor 12 is configured to control an operation of the station, including sending a first radio frame to an access point by using the main transceiver. Further, the station may further include a memory 13, and the memory 13 may include a read-only memory and a random access memory, and is configured to provide an instruction and data for the processor 12. The memory 13 may be integrated into the processor 12, or may be independent of the processor 12. A part of the memory 13 may further include a nonvolatile random access memory (NVRAM).

The processor 12 may be a general-purpose processor, a digital signal processor, a dedicated integrated circuit, a field-programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, or may be any conventional processor, or the like. The steps of the methods disclosed with reference to the embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory 13, and the processor 12 reads information in the memory 13 and completes the steps of the process indicated in the embodiments of the present invention with reference to hardware of the processor 12.

Optionally, the main transceiver 10 is configured to send the first radio frame to the access point. The first radio frame includes first indication information, where the first indication information is used to indicate that the station requests to enter a conventional power save mode, and the conventional power save mode is a mode in which the main transceiver wakes up according to a preset time period and receives a beacon frame sent by the access point.

The main transceiver 10 is further configured to send a second radio frame to the access point, and the second radio frame includes second indication information, where the second indication information is used to indicate that the station requests to enter a wake-up radio WUR sleep mode. The WUR sleep mode is a mode in which the wake-up receiver wakes up the main transceiver in a doze state when receiving a wake-up frame.

The wake-up receiver 11 is configured to: when the station is in both the conventional power save mode and the WUR sleep mode, receive the wake-up frame and wake up the main transceiver, where the main transceiver does not wake up according to the preset time period.

Optionally, the main transceiver 10 is further configured to send a listen interval parameter to the access point. A value of the listen interval parameter is a preset value, the listen interval parameter is used to indicate a length of the preset time period, and the preset value is used to represent that the main transceiver does not wake up according to the preset time period.

Optionally, downlink service indication information of the station is absent from the beacon frame.

Optionally, the second radio frame further includes third indication information, and the third indication information is used to indicate whether the access point adds the downlink service indication information of the station to the beacon frame.

Optionally, the station further includes the processor 12.

The main transceiver 10 is further configured to receive a first response frame sent by the access point, the first response frame includes fourth indication information, and the fourth indication information is used to indicate whether the station is allowed to enter the WUR sleep mode.

If the fourth indication information indicates that the station is allowed to enter the WUR sleep mode, the processor 12 controls the station to enter the WUR sleep mode.

Optionally, the main transceiver 10 is further configured to send a third radio frame to the access point, the third radio frame includes fifth indication information, and the fifth indication information is used to indicate that the station requests to disable the WUR sleep mode.

The main transceiver 10 is configured to receive a second response frame sent by the access point, and the second response frame includes sixth indication information, where the sixth indication information is used to indicate whether the station is allowed to disable the WUR sleep mode.

If the sixth indication information indicates that the station is allowed to disable the WUR sleep mode, the processor 12 controls the station to disable the WUR sleep mode.

By implementing this embodiment of the present invention, the station sends the first radio frame to the access point. The first radio frame includes the first indication information, and the first indication information is used to indicate that the station requests to enter the conventional power save mode. The station sends the second radio frame to the access point, and the second radio frame includes the second indication information, where the second indication information is used to indicate that the station requests to enter the WUR sleep mode. When the station is in both the conventional power save mode and the WUR sleep mode, the station does not wake up according to the preset time period, but only wakes up the main transceiver when the wake-up frame is received. In this manner, the newly added WUR sleep mode can be integrated with the conventional power save mode. In addition, the main transceiver does not wake up according to the preset time period, power consumption of the station can be reduced.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium includes any medium that can store program code, such as a ROM, a random access memory RAM, a magnetic disk, or an optical disc,

What is claimed is:
1. A station wake-up method, wherein the method is applied to a station, the station comprises a wake-up receiver and a main transceiver, and the method comprises:
when the station is in both a conventional power save mode and in a wake-up radio (WUR) sleep mode, the main transceiver of the station refraining from waking up, according to a preset time period, to receive a beacon frame; wherein the conventional power save mode is a mode in which the main transceiver wakes up according to the preset time period and receives the beacon frame sent by an access point, and the WUR sleep mode is a mode in which the wake-up receiver wakes up the main transceiver in a doze state when receiving a wake-up frame, and the main transceiver of the station refraining from waking up comprises:

the station entering the conventional power save mode, wherein the main transceiver of the station wakes up according to the preset time period to receive the beacon frame, and the main transceiver of the station disables the waking up according to the preset time period when the station enters the WUR sleep mode; or the station entering the WUR sleep mode, and the main transceiver of the station disables the waking up according to the preset time period when the station enters the conventional power save mode.

2. The method according to claim 1, wherein the main transceiver of the station disables the waking up according to a preset time period, comprises:

waking up, by the station, the main transceiver in the doze state when receiving a wake-up frame sent by the access point; or:

waking up, by the main transceiver according to a time different from the preset time period, to receive the beacon frame; or the main transceiver of the station, refraining from waking up to receive a beacon frame.

3. The method according to claim 1, wherein the station entering the conventional power save mode comprises:

sending, by the station, a first radio frame to the access point, wherein the first radio frame comprises first indication information, and the first indication information is used to indicate that the station requests to enter the conventional power save mode; and receiving, by the station, an acknowledgement frame sent by the access point corresponding to the station requests to enters the conventional power save mode.

4. The method according to claim 3, wherein when a value of a power management field in the first radio frame is set to 1, the first radio frame indicates that the station expects to switch from an active mode to the conventional power save mode; or when a value of a power management field in the first radio frame is set to 0, the first radio frame indicates that the station expects to switch from the conventional power save mode to the active mode.

5. The method according to claim 1, wherein the station entering the WUR sleep mode comprising:

sending, by the station, a second radio frame to the access point, wherein the second radio frame comprises second indication information, and the second indication information is used to indicate that the station requests to enter the WUR sleep mode;

receiving, by the station, a first response frame sent by the access point, wherein the first response frame comprises fourth indication information, and the fourth indication information is used to indicate whether the station is allowed to enter the WUR sleep mode; and when the fourth indication information indicates that the station is allowed to enter the WUR sleep mode, entering, by the station, the WUR sleep mode.

6. The method according to claim 3, wherein before the sending, by the station, a first radio frame to the access point, the method further comprises:

sending, by the station, a listen interval parameter to the access point, wherein a value of the listen interval parameter is a preset value, the listen interval parameter is used to indicate a length of the preset time period, and the preset value is used to represent that the main transceiver does not wake up according to the preset time period.

7. The method according to claim 6, wherein downlink service indication information of the station is absent from the beacon frame.

8. The method according to claim 5, wherein the second radio frame further comprises third indication information, and the third indication information is used to indicate whether the access point adds downlink service indication information of the station to the beacon frame.

9. The method according to claim 5, wherein the method further comprises:

sending, by the station, a third radio frame to the access point, wherein the third radio frame comprises fifth indication information, and the fifth indication information is used to indicate that the station requests to disable the WUR sleep mode;

receiving, by the station, a second response frame sent by the access point, wherein the second response frame comprises sixth indication information, and the sixth indication information is used to indicate whether the station is allowed to disable the WUR sleep mode; and when the sixth indication information indicates that the station is allowed to disable the WUR sleep mode, disabling, by the station, the WUR sleep mode.

10. A station, wherein the station comprises a wake-up receiver and a main transceiver; and wherein when the station is in both a conventional power save mode and in a WUR sleep mode, the main transceiver refrains from waking up according to a preset time period to receive a beacon frame; wherein the conventional power save mode is a mode in which the main transceiver wakes up according to the preset time period and receives the beacon frame sent by an access point, and the WUR sleep mode is a mode in which the wake-up receiver wakes up the main transceiver in a doze state when receiving a wake-up frame; and wherein when the station enters the conventional power save mode, the main transceiver of the station wakes up according to the preset time period to receive the beacon frame, and the main transceiver of the station is configured to disable the waking up according to the preset time period when the station enters the WUR sleep mode; or the main transceiver of the station is configured to disable the waking up according to the preset time period when the station enters the conventional power save mode.

11. The station according to claim 10, wherein the wake-up receiver is configured to receive the wake-up frame sent by the access point, and wake up the main transceiver in the doze state or;

the main transceiver is configured to wake up according to a time different from the preset time period, to receive the beacon frame; or the main transceiver of the station, is configured to refrain from waking up to receive a beacon frame.

12. The station according to claim 10, wherein
the main transceiver is further configured to send a first radio frame to the access point, wherein the first radio frame comprises first indication information, and the first indication information is used to indicate that the station requests to enter the conventional power save mode;
the main transceiver is further configured to receive, an acknowledgement frame sent by the access point; and
wherein the station comprises at least one processor that is configured to control the station to enter the conventional power save mode.

13. The station according to claim 12, wherein
when a value of a power management field in the first radio frame is set to 1, the first radio frame indicates that the station expects to switch from an active mode to the conventional power save mode; or
when a value of a power management field in the first radio frame is set to 0, the first radio frame indicates that the station expects to switch from the conventional power save mode to the active mode.

14. The station according to claim 10, wherein
the main transceiver is further configured to send a second radio frame to the access point, wherein the second radio frame comprises second indication information, and the second indication information is used to indicate that the station requests to enter the WUR sleep mode; and
the main transceiver is further configured to receive a first response frame sent by the access point, wherein the first response frame comprises fourth indication information, and the fourth indication information is used to indicate whether the station is allowed to enter the WUR sleep mode; and
the station comprises at least one processor that controls the station to enter the WUR sleep mode when the fourth indication information indicates that the station is allowed to enter the WUR sleep mode.

15. The station according to claim 12, wherein
the main transceiver is further configured to send a listen interval parameter to the access point, wherein a value of the listen interval parameter is a preset value, the listen interval parameter is used to indicate a length of the preset time period, and the preset value is used to represent that the main transceiver does not wake up according to the preset time period.

16. The station according to claim 15, wherein downlink service indication information of the station is absent from the beacon frame.

17. The station according to claim 14, wherein the second radio frame further comprises third indication information, and the third indication information is used to indicate whether the access point adds downlink service indication information of the station to the beacon frame.

18. The station according to claim 14, wherein
the main transceiver is further configured to send a third radio frame to the access point, wherein the third radio frame comprises fifth indication information, and the fifth indication information is used to indicate that the station requests to disable the WUR sleep mode;
the main transceiver is configured to receive a second response frame sent by the access point, wherein the second response frame comprises sixth indication information, and the sixth indication information is used to indicate whether the station is allowed to disable the WUR sleep mode; and
when the sixth indication information indicates that the station is allowed to disable the WUR sleep mode, the at least one processor controls the station to disable the WUR sleep mode.

* * * * *